US010155837B2

(12) United States Patent
Brown et al.

(10) Patent No.: US 10,155,837 B2
(45) Date of Patent: Dec. 18, 2018

(54) SUSTAINABLE POLYESTER POLYOL COMPOSITIONS

(71) Applicant: RESINATE MATERIALS GROUP, INC., Plymouth, MI (US)

(72) Inventors: Matt Brown, Novi, MI (US); Michelle Samson, Van Buren Township, MI (US); Jack R. Kovsky, Detroit, MI (US); Woo-Sung Bae, Midland, MI (US); Shakti L. Mukerjee, Canton, MI (US); Rick Tabor, Plymouth, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 0 days.

(21) Appl. No.: 15/665,929

(22) Filed: Aug. 1, 2017

(65) Prior Publication Data

US 2018/0030197 A1    Feb. 1, 2018

Related U.S. Application Data

(63) Continuation of application No. PCT/US2017/042735, filed on Jul. 19, 2017.

(60) Provisional application No. 62/450,485, filed on Jan. 25, 2017, provisional application No. 62/368,496, filed on Jul. 29, 2016.

(51) Int. Cl.
| | |
|---|---|
| *C08G 18/42* | (2006.01) |
| *C08G 18/08* | (2006.01) |
| *C08G 18/76* | (2006.01) |
| *C08G 63/91* | (2006.01) |
| *C08G 18/48* | (2006.01) |
| *C08G 18/63* | (2006.01) |
| *C08G 18/66* | (2006.01) |
| *C08G 18/16* | (2006.01) |
| *C08G 18/20* | (2006.01) |
| *C08G 18/24* | (2006.01) |
| *C08G 18/32* | (2006.01) |
| *C08G 18/40* | (2006.01) |
| *C08G 101/00* | (2006.01) |

(52) U.S. Cl.
CPC ......... *C08G 18/4213* (2013.01); *C08G 18/14* (2013.01); *C08G 18/165* (2013.01); *C08G 18/2018* (2013.01); *C08G 18/246* (2013.01); *C08G 18/3275* (2013.01); *C08G 18/4018* (2013.01); *C08G 18/4072* (2013.01); *C08G 18/4288* (2013.01); *C08G 18/4829* (2013.01); *C08G 18/4841* (2013.01); *C08G 18/632* (2013.01); *C08G 18/6622* (2013.01); *C08G 18/7621* (2013.01); *C08G 18/7671* (2013.01); *C08G 63/916* (2013.01); *C08G 2101/0008* (2013.01); *C08G 2101/0083* (2013.01)

(58) Field of Classification Search
CPC ............... C08G 18/14; C08G 18/4213; C08G 18/7621; C08G 63/916; C08G 2101/0008; C08G 2101/0083
See application file for complete search history.

(56) References Cited

U.S. PATENT DOCUMENTS

| | | | |
|---|---|---|---|
| 4,436,843 A | 3/1984 | Rowton et al. | |
| 4,469,823 A | 9/1984 | Yeakey et al. | |
| 4,608,432 A | 8/1986 | Magnus et al. | |
| 5,605,939 A | 2/1997 | Hager | |
| 5,674,920 A | 10/1997 | Obata et al. | |
| 5,877,255 A | 3/1999 | Gerber et al. | |
| 5,922,779 A | 7/1999 | Hickey | |
| 6,391,935 B1 | 5/2002 | Hager et al. | |
| 6,593,387 B2 | 7/2003 | Parfondry et al. | |
| 6,664,363 B1 | 12/2003 | Faunce | |
| 6,734,220 B2 | 5/2004 | Niederoest et al. | |
| 6,797,736 B1 | 9/2004 | Simiecinski et al. | |
| 7,238,730 B2 | 7/2007 | Apichatachutapan et al. | |
| 8,236,866 B2 | 8/2012 | Casati et al. | |
| 9,096,727 B2 | 8/2015 | Ma et al. | |
| 9,150,684 B2 | 10/2015 | Meyer et al. | |
| 2004/0254256 A1 | 12/2004 | Lockwood et al. | |
| 2004/0259967 A1 | 12/2004 | Neill et al. | |
| 2004/0266900 A1 | 12/2004 | Neff et al. | |
| 2009/0131625 A1 | 5/2009 | Kurian et al. | |
| 2009/0264547 A1 | 10/2009 | Klesczewski et al. | |
| 2010/0298453 A1* | 11/2010 | McAdams | C12Q 1/6879 521/97 |
| 2012/0302652 A1 | 11/2012 | Meyer et al. | |
| 2015/0051304 A1* | 2/2015 | Shieh | C08J 9/143 521/98 |
| 2016/0053050 A1 | 2/2016 | Tabor et al. | |

* cited by examiner

OTHER PUBLICATIONS

PCT International Search Report and Written Opinion dated Sep. 28, 2017 from corresponding Application No. PCT/US2017/042735, 13 pages.

*Primary Examiner* — John M Cooney
(74) *Attorney, Agent, or Firm* — Dilworth IP, LLC

(57) ABSTRACT

Polyester polyol compositions are disclosed. The polyol compositions, which comprise recurring units of a digested thermoplastic polyester, a glycol, and castor oil, ricinoleic acid, or a mixture of castor oil and ricinoleic acid, have hydroxyl numbers within the range of 20 to 150 mg KOH/g and average hydroxyl functionalities within the range of 2.5 to 3.5. The invention includes flexible polyurethane foams that incorporate the polyester polyols. Sustainable polyester polyols made completely or in substantial part from recycled, post-industrial, and/or biorenewable materials such as polyethylene terephthalate, glycols, and castor oil are provided. The polyols have desirable properties for formulating flexible polyurethane foams and other products.

17 Claims, No Drawings

SUSTAINABLE POLYESTER POLYOL COMPOSITIONS

FIELD OF THE INVENTION

The invention relates to polyester polyol compositions useful for the production of flexible polyurethane foams and other products.

BACKGROUND OF THE INVENTION

Flexible polyurethane foams are tailored to meet the needs of particular markets. When good load bearing properties are needed, the polyols may include a polymeric component, such as a styrene-acrylonitrile polymer polyol dispersed in a base polyether polyol. When high reactivity is needed, as in the production of molded foams, "reactive polyols" having a high content of primary hydroxyl groups are used. Still other polyols are used at low NCO/OH index to produce viscoelastic (or "memory") foam. In general, however, the polyols used to make these flexible foams are polyether-based materials derived from petroleum.

Aromatic polyester polyols are commonly used to produce rigid polyurethane or polyisocyanurate foams, but relatively few sources recommend using such polyols to produce flexible polyurethane foams. Rigid foams normally require polyols with average hydroxyl functionalities greater than about 2.5 and relatively high hydroxyl numbers that range from 200-300 mg KOH/g. Usually, the aromatic polyester polyols are made by polycondensation of diacids or anhydrides with diols, although in some cases, polyethylene terephthalate has been proposed as a suitable reactant. Some references also suggest incorporation of natural oils or other hydrophobes into the aromatic polyester polyols for the purpose of improving compatibility with the hydrocarbon blowing agents used to produce rigid foams. For examples of such aromatic polyester polyols, see U.S. Pat. Nos. 4,608,432; 5,877,255; 5,922,779; and 6,664,363.

Currently, only a minor fraction of polyols used to produce flexible polyurethane foam comes from biorenewable resources or recycled materials. Recycled polyethylene terephthalate (PET), polybutylene terephthalate (PBT), and other thermoplastics provide a low-cost, potentially valuable feedstock for making polyols for flexible foams while decreasing our reliance on petrochemical-based polyether polyols.

The industry would benefit from the availability of sustainable polyols suitable for use in the production of flexible polyurethane foams and other products. Such polyols should have sufficiently high average hydroxyl functionality (i.e., from about 2.5 to 3.0) and hydroxyl numbers in the useful range of about 20 to 150 mg KOH/g. Ideally, the polyols could be formulated completely or substantially from recycled (such as the nearly endless supply of recycled PET), post-industrial, and biorenewable materials.

SUMMARY OF THE INVENTION

In one aspect, the invention relates to a polyester polyol composition. The composition comprises recurring units of a digested thermoplastic polyester, a glycol, and castor oil, ricinoleic acid, or a mixture of castor oil and ricinoleic acid. The composition comprises 5 to 30 wt. %, based on the amount of thermoplastic polyester, of the digested thermoplastic polyester. The polyester polyol composition comprises, based on the amount of polyol composition, 2 to 20 wt. % of the glycol and 25 to 85 wt. % of the castor oil, ricinoleic acid, or mixture thereof. Additionally, the polyol composition has a hydroxyl number within the range of 20 to 150 mg KOH/g and an average hydroxyl functionality within the range of 2.5 to 3.5.

In other aspects, the polyester polyol optionally comprises 2 to 30 wt. % of recurring units of a dicarboxylic acid, diester, or anhydride, or combinations thereof.

In other aspects, the polyester polyol optionally comprises 0.1 to 2 wt. % of recurring units of glycerin.

In another aspect, the polyester polyol composition comprises recurring units of 10 to 20 wt. %, based on the amount of thermoplastic polyester, of polyethylene terephthalate. This polyester polyol composition further comprises, based on the amount of composition, 30 to 50 wt. % of castor oil, 10 to 15 wt. % of diethylene glycol, and 15 to 25 wt. % of adipic acid. In this aspect, the composition has a hydroxyl number within the range of 40 to 75 mg KOH/g and an average hydroxyl functionality within the range of 2.7 to 3.0. Optionally, the composition further comprises 0.1 to 2 wt. % of glycerin.

In yet another aspect, the polyester polyol composition comprises recurring units of 5 to 10 wt. %, based on the amount of thermoplastic polyester, of polyethylene terephthalate. This polyester polyol composition further comprises, based on the amount of composition, 75 to 85 wt. % of castor oil, 3 to 6 wt. % of diethylene glycol, and 3 to 6 wt. % of phthalic anhydride. In this aspect, the polyester polyol composition has a hydroxyl number within the range of 120 to 150 mg KOH/g and an average hydroxyl functionality within the range of 2.5 to 2.8. Optionally, the composition further comprises 0.1 to 2 wt. % of glycerin.

The invention includes flexible polyurethane foams that incorporate the polyester polyols. These include flexible slabstock foams, high-resilience foams, molded foams, and viscoelastic foams.

With readily available building blocks such as polyethylene terephthalate, glycols, and castor oil, the invention provides sustainable polyester polyols made completely or substantially from recycled, post-industrial, and/or biorenewable materials. The polyols have desirable properties for formulating flexible polyurethane foams and other products.

DETAILED DESCRIPTION OF THE INVENTION

In one aspect, the invention relates to a polyester polyol composition. The polyester polyol composition comprises recurring units of a digested thermoplastic polyester, a glycol, and castor oil, ricinoleic acid, or a mixture of castor oil and ricinoleic acid. The amount of digested thermoplastic polyester in the polyol composition is 5 to 30 wt. %, preferably 8 to 25 wt. % or 8 to 20 wt. %, based on the amount of thermoplastic polyester. The amount of glycol is 2 to 20 wt. %, preferably 3 to 18 wt. % or 4 to 15 wt. %, based on the amount of polyester polyol composition. The amount of castor oil, ricinoleic acid, or mixture thereof is 25 to 85 wt. %, in some aspects 25 to 55%, and in other aspects 70 to 85%, based on the amount of polyester polyol composition. In some aspects, the polyester polyol composition may include 2 to 30 wt. % or 3 to 25 wt. % or 5 to 20 wt. %, based on the amount of polyester polyol composition, of a dicarboxylic acid, diester, or anhydride, or combination thereof. In other aspects, the polyester polyol composition may include 0.1 to 2 wt. % or 0.2 to 1.5 wt. % or 0.5 to 1 wt. %, based on the amount of polyester polyol composition, of glycerin.

The polyester polyol compositions have a hydroxyl number within the range of 20 to 150 mg KOH/g. In some aspects, the hydroxyl number ranges from 40 to 150 mg KOH/g; in other aspects, the hydroxyl number ranges from 50 to 140 mg KOH/g.

The polyester polyol compositions have an average hydroxyl functionality within the range of 2.5 to 3.5. In some aspects, the polyester polyol compositions have an average hydroxyl functionality within the range of 2.5 to 3.0 or from 2.65 to 2.90.

Thermoplastic polyesters suitable for use in making the polyester polyol compositions are well known in the art. They are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); polyhydroxy alkanoates, e.g., polyhydroxybutyrate; copolymers of diols with 2,5-furandicarboxylic acid or dialkyl 2,5-furandicarboxylates, e.g., polyethylene furanoate; copolymers of 2,2,4,4-tetramethyl-1,3-cyclobutanediol with isophthalic acid, terephthalic acid or orthophthalic derivatives; dihydroferulic acid polymers; and the like, and mixtures thereof. Further examples of polyester thermoplastics are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters may be found in Chapters 18-20 of *Handbook of Thermoplastics*, O. Olabisi, ed., 1997, Marcel Dekker, Inc. New York. Suitable thermoplastic polyesters include virgin polyesters, recycled polyesters, or mixtures thereof. Polyethylene terephthalate is particularly preferred, especially recycled polyethylene terephthalate (rPET), virgin PET, and mixtures thereof. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

In some aspects, scrap PET from the automotive industry provides the source of suitable raw material. Such PET-containing materials include, among other things, non-woven trunk liners, batting, wheel well lining, carpeting, seat fabric, automotive parts dunnage such as shipping trays for parts, strapping used to hold boxes of parts on a pallet, windshield wiper arms and gear housings, engine covers, headlamp retainers, connector housings, wire harnesses, and fuse boxes. Automotive trunk liners are a particularly useful source of scrap PET.

The polyester polyol compositions comprise recurring units of a glycol. Glycols suitable for use are well known. By "glycol," we mean a linear or branched, aliphatic or cycloaliphatic compound or mixture of compounds having two or more hydroxyl groups. Other functionalities, particularly ether or ester groups, may be present in the glycol. In preferred glycols, two of the hydroxyl groups are separated by from 2 to 10 carbons, preferably 2 to 5 carbons. Suitable glycols include, for example, ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 2,2,4,4-tetramethyl-1,3-cyclobutanediol, 3-methyl-1,5-pentanediol, 1,4-cyclohexanedimethanol, 1,3-cyclohexanedimethanol, bisphenol A ethoxylates, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. Diethylene glycol is particularly preferred. In other aspects, the glycol is a recycled glycol, especially recycled propylene glycol. Propylene glycol recovered from used deicing fluids is one example.

The polyester polyol compositions comprise recurring units of castor oil, ricinoleic acid, or mixtures thereof. Castor oil occurs naturally in seeds of the castor oil plant (*Ricinus communis*). About 85-95% of the fatty acid residues in castor oil are from ricinoleic acid. Minor proportions of oleic acid, linoleic acid, stearic acid, palmitic acid, and other components make up the balance of the acid residues. Suitable castor oil and ricinoleic acid are available from commercial sources. Polyester polyol compositions of the invention can be produced from castor oil alone, ricinoleic acid alone, or any combination thereof. As indicated earlier, the amount of castor oil, ricinoleic acid, or mixture thereof is 25 to 85 wt. %, in some aspects 25 to 55%, and in other aspects 70 to 85%, based on the amount of polyester polyol composition. In particular aspects, the polyester polyol composition comprises 25 to 55 wt. % of recurring units from castor oil. In other particular aspects, the polyester polyol composition comprises 70 to 85 wt. % of recurring units from castor oil. In other particular aspects, the polyester polyol composition comprises 20 to 30 wt. % of recurring units from ricinoleic acid.

In some aspects, the thermoplastic polyester and glycol are first heated, optionally in the presence of a catalyst, to give a digested intermediate. The digested intermediate will commonly be a mixture of glycol reactant, glycol(s) generated from the thermoplastic polyester, terephthalate oligomers, and other glycolysis products. For example, when PET or rPET is the thermoplastic polyester, the digested intermediate will include a mixture of glycol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140). Heating is advantageously performed at temperatures within the range of 80° C. to 260° C., preferably 100° C. to 240° C., more preferably 130° C. to 210° C., and most preferably 160° C. to 185° C.

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, or other metals. Specific examples include titanium alkoxides (e.g., tetrabutyl titanate), titanium(IV) phosphate, zirconium alkoxides, zinc acetate, lead acetate, cobalt acetate, manganese(II) acetate, antimony trioxide, germanium oxide, or the like, and mixtures thereof. Catalysts that do not significantly promote isocyanate reaction chemistries are preferred. The amount of catalyst used is typically in the range of 0.005 to 5 wt. %, preferably 0.01 to 1 wt. %, more preferably 0.02 to 0.7 wt. %, based on the total amount of polyester polyol composition being prepared.

Usually, the digestion reaction is performed by heating the thermoplastic polyester, glycol(s), and any catalyst at least until the mixture liquefies and particles of the thermoplastic polyester are no longer apparent. Reaction times range from about 30 minutes to about 16 hours, more typically 1 to 10 hours, even more typically 3 to 8 hours, and will depend on the reaction temperature, source of the thermoplastic polyester, the particular glycol reactant used, mixing rate, desired degree of depolymerization, and other factors that are within the skilled person's discretion.

The molar ratio of glycol to thermoplastic polyester is at least 1.0, preferably 2.0 to 6.0.

When a digested intermediate is prepared, it is reacted in a second step with castor oil, ricinoleic acid, or a mixture thereof, to give an inventive polyester polyol. The reaction between the digested intermediate and the castor oil, ricinoleic acid, or a mixture thereof is performed under conditions effective to promote one or more of several different possible reactions between the digested intermediate and the oil component, principally condensation reactions. For instance, hydroxyl groups in the digested intermediate can react with acid or ester groups in the castor oil, ricinoleic acid, or a mixture thereof to generate esters from the acids or new esters from the original ones. Because castor oil and ricinoleic acid have hydroxyl functionality as well, new esters can be formed that utilize that hydroxyl functionality.

Reactions between the digested intermediate and the castor oil, ricinoleic acid, or a mixture thereof are preferably performed by heating at temperatures within the range of 80° C. to 260° C., preferably 90° C. to 230° C., more preferably 100° C. to 220° C., and most preferably 110° C. to 210° C. Water generated in this reaction is advantageously removed from the reaction mixture as it forms. On a lab scale, it is convenient to use a Dean-Stark trap or similar apparatus to remove the water of reaction, but other means will be more practical on a larger scale. Continuous processes for water removal, such as vacuum stripping, wiped-film evaporation, sparging with dry air or nitrogen, and the like, may be desirable. The reaction is normally continued until a pre-determined amount of water has been collected or a target acid number and/or hydroxyl number is reached for the product.

The polyester polyol composition may include recurring units of one or more anhydrides, diesters, or dicarboxylic acids. Suitable dicarboxylic acids include, for example, glutaric acid, adipic acid, succinic acid, cyclohexane dicarboxylic acids, maleic acid, fumaric acid, itaconic acid, phthalic acid, 1,5-furandicarboxylic acid, dimer or trimer fatty acids, isophthalic acid, and anhydrides thereof (e.g., maleic anhydride, phthalic anhydride, itaconic anhydride, and the like). Mixtures of dicarboxylic acids can be used, including, e.g., the commercially available mixture of dibasic acids known as "DBA." A typical DBA composition might contain 51-61 wt. % glutaric acid, 18-28 wt. % succinic acid, and 15-25 wt. % adipic acid. Adipic acid and phthalic anhydride are particularly preferred. In particular aspects, the polyester polyol composition comprises 15 to 25 wt. % of recurring units from adipic acid.

In another aspect, the polyester polyol is made in a single step by reacting the thermoplastic polyester, glycol, and the castor oil, ricinoleic acid, or a mixture thereof under conditions effective to produce the polyol. In some aspects, when the single-step process is used, it is preferred to utilize a condensation system that returns glycols to the reaction vessel while allowing removal of water.

In certain preferred aspects, the polyester polyol composition comprises recurring units of 10 to 20 wt. %, based on the amount of thermoplastic polyester, of polyethylene terephthalate, 30 to 50 wt. % of castor oil, 10 to 15 wt. % of diethylene glycol, 15 to 25 wt. % of adipic acid, and optionally, 0.1 to 2 wt. % of glycerin. In these aspects, the polyol composition has a hydroxyl number within the range of 40 to 75 mg KOH/g and an average hydroxyl functionality within the range of 2.7 to 3.0.

In other preferred aspects, the polyester polyol composition comprises recurring units of 5 to 10 wt. %, based on the amount of thermoplastic polyester, of polyethylene terephthalate, 75 to 85 wt. % of castor oil, 3 to 6 wt. % of diethylene glycol, 3 to 6 wt. % of phthalic anhydride, and optionally, 0.1 to 2 wt. % of glycerin. In these aspects, the polyol composition has a hydroxyl number within the range of 120 to 150 mg KOH/g and an average hydroxyl functionality within the range of 2.5 to 2.8.

The polyester polyol compositions are preferably flowable liquids under ambient conditions. Preferably, the polyols have viscosities measured at 25° C. less than 30,000 cP, more preferably less than 20,000 cP, most preferably less than 10,000 cP. A preferred range for the polyol viscosity is 300 to 5,000 cP, more preferably 500 to 3,000 cP. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyester polyol compositions preferably have low acid numbers. Urethane manufacturers will often require that a polyol have an acid number below a particular specification. Low acid numbers can be ensured by driving reactions by removal of water from the reaction mixture to the desired level of completion. Preferably, the polyols have an acid number less than 30 mg KOH/g, more preferably less than 10 mg KOH/g, and most preferably less than 5 mg KOH/g. Acid numbers can be adjusted if necessary for a particular application with an acid scavenger such as, for example, an epoxide derivative, and this treatment can be performed by the manufacturer, distributor, or end user.

The polyester polyol compositions offer the advantage of reduced reliance on petrochemical sources for raw material. This contrasts with traditional polyether polyols used to make flexible polyurethane foams, which are usually petrochemical based. Preferably, the polyols include greater than 20 wt. %, more preferably greater than 50 wt. %, most preferably greater than 80 wt. % of recycle or biorenewable content. A preferred range for the combined recycle and biorenewable content is 50 to 100 wt. %. By "recycle content," we mean the combined amounts of thermoplastic polyester and any recycled glycol or dicarboxylic acid or ester component. Some glycols, such as propylene glycol or ethylene glycol, are available as recovered or recycled materials. For instance, propylene glycol is used in deicing fluids, and after use, it can be recovered, purified, and reused. Some glycols, e.g., diethylene glycol, are obtained as by-products of petrochemical processes. The castor oil, ricinoleic acid, or mixture thereof is biorenewable.

Flexible Polyurethane Foams

The inventive polyester polyol compositions are useful for producing flexible polyurethane foams, particularly water-blown foams. Thus, in one aspect, the invention relates to a flexible polyurethane foam comprising a reaction product of an inventive polyester polyol composition as described above, water, and a polyisocyanate. Water reacts with isocyanate groups, ultimately generating carbon dioxide, which serves as a blowing agent for the foam. The flexible foam can be, for instance, a slabstock foam, high resilience foam, hot or cold molded foam, or a viscoelastic foam.

Methods for producing flexible foams are well known and are described in many references. In general, foams are made by combining the polyols, surfactant (often a siloxane polymer), blowing catalyst (usually an amine), urethane catalyst (usually a tin compound such as dibutyltin dilaurate or stannous octoate), crosslinking agents or extenders (e.g., diethanolamine or N,N-dimethylethanolamine), and water to produce a "B side" reactant stream. The "A side" usually consists of one or more polyisocyanate components. The "A" and "B" sides are combined and rapidly mixed, and the resulting reaction mixture is transferred to a mold or in some cases is applied to a moving conveyor to produce a free-rise foam. The reaction mixture foams until physical properties develop sufficiently to form a cured, solid, cellular product.

Polyisocyanates suitable for use in making the flexible foams are well known; they include aromatic, aliphatic, and cycloaliphatic polyisocyanates. Examples include toluene diisocyanates (TDIs), MDIs, polymeric MDIs, naphthalene diisocyanates (NDIs), hydrogenated MDIs, trimethyl- or tetramethylhexamethylene diisocyanates (TMDIs), hexamethylene diisocyanate (HDI), isophorone diisocyanates (IPDIs), cyclohexane diisocyanates (CHDIs), xylylene diisocyanates (XDI), hydrogenated XDIs, and the like. Toluene diisocyanates, MDIs, and polymeric MDIs are particularly preferred.

The NCO/OH index will depend on the kind of foam being produced. Generally this index will have a value in the range of 0.80 to 1.10, more typically 0.85 to 1.05. Viscoelastic foams are usually formulated at an NCO/OH index less than 1, typically 0.80 to 0.95. Other foams are more typically formulated at a higher NCO/OH index, typically 0.95 to 1.15, 1.00 to 1.10, or 1.00 to 1.05.

In some aspects, a blend of one or more polyether polyols or polymer polyols and one or more inventive polyester polyols is used. In some aspects, a preferred blend would comprise a polyether polyol or polymer polyol having a hydroxyl number within the range of 20 to 150 and an average hydroxyl functionality within the range of 2.5 to 3.5.

Flexible slabstock foam is made with polyether polyols, typically triol-initiated, and frequently includes polyols that have 20-50% by weight of dispersed or suspended polymer particles, for instance, styrene-acrylonitrile ("SAN") polymer particles. These "polymer polyols" impart load-bearing properties and they are normally a major component of high-resilience foams. Most flexible slabstock foam is produced continuously or semi-continuously. The inventive polyols can be used alone or in combination with conventional polyether polyols and/or polymer polyols for the production of flexible slabstock foams.

Hot or cold-molded flexible foams are also well known. These foams are usually made with at least one "reactive" polyol. Reactive polyols have a relatively high content of primary hydroxyl end groups. Traditionally, reactive polyols have recurring propylene oxide (PO) units as a backbone and are end-capped with ethylene oxide (EO) units to impart the primary hydroxyl content. The higher reactivity of primary hydroxyl groups with free NCO groups of polyisocyanates gives these polyols the desired high reactivity. The reaction mixture is typically injected into a mold that may be heated or not as desired. The inventive polyols can be used alone or in combination with conventional polyether polyols and/or "reactive" polyols for the production of molded flexible foams.

Viscoelastic flexible foams (or "memory foams") have low resilience and are normally formulated at low NCO/OH index, typically 0.80 to 0.95. These foams are ideal as bedding layers and for other similar purposes for which it is helpful for the foam to "remember" the shape of the load. A variety of different polyols have been used to create these foams, although most are polyether polyols. Commonly, at least one polyol having a relatively high content of EO recurring units is included in these formulations. The inventive polyols can be used alone or in combination with conventional polyether polyols for the production of viscoelastic flexible foams.

For examples of flexible slabstock, molded, and viscoelastic foams and their methods of production, see U.S. Pat. Nos. 4,436,843; 5,605,939; 5,674,920; 6,391,935; 6,593,387; 6,734,220; 6,797,736; 7,238,730; 8,236,866; 9,096,727; 9,150,684, and U.S. Publ. Nos. 2004/0254256; 2004/0259967; 2004/0266900; 2009/0264547; 2013/0289150, the teachings of which are incorporated herein by reference.

The inventive polyester polyol compositions can be used to formulate other polyurethane products in addition to flexible foams. By adjusting the proportion of castor oil and/or ricinoleic acid used, a desired degree of polyol hydrophobicity can be "dialed in." The ability to control hydrophobicity is particularly valuable, for instance, in the coatings industry. The polyols can be used for cellular, microcellular, and non-cellular applications including rigid foams (including polyisocyanurate foams), urethane dispersions, coatings, adhesives, sealants, and elastomers. The resulting polyurethanes are potentially useful for automotive and transportation applications, building and construction products, marine products, packaging materials, carpet backing, appliance insulation, cast elastomers and moldings, footwear, biomedical devices, and other applications.

The following examples merely illustrate the invention; the skilled person will recognize many variations that are within the spirit of the invention and scope of the claims.

Polyester Polyol Syntheses:

Polyol A

A 4-neck round-bottom flask equipped with overhead mixing, reflux condenser, nitrogen flow, heating mantle, and temperature controller is charged with post-industrial poly(ethylene terephthalate) (8.2 pbw), diethylene glycol (4.5 pbw), and glycerin (0.9 pbw). Mixing commences, and the mixture is heated to 220° C. under a flow of nitrogen. Titanium(IV) butoxide (0.15 pbw) is added when the pot temperature exceeds 100° C. to prevent catalyst deactivation by water. The reactor contents are mixed at 220° C. for 4-6 hours until few solids remain. The reactor is cooled and the reflux condenser is replaced with a five-plate vacuum-jacketed column and short-path distillation head. Castor oil (82.4 pbw) and phthalic anhydride (4.4 pbw) are added. The resulting reaction mixture is heated to 220° C. for 10-12 h, during which time water distills from the reactor and the esterification reaction proceeds. Nitrogen flow is increased to aid in water removal. When the acid number is less than 5 mg KOH/g, the reaction is considered complete, and the product is cooled. The final product is filtered through a fine glass frit, collected, and characterized. Hydroxyl number: 140 mg KOH/g; average hydroxyl functionality: 2.65; viscosity: 1515 cP at 25° C.; Mn: 1063 g/mol; Mw/Mn: 1.6; acid number: 1.3 mg KOH/g; sustainable content: 95.5 wt. %; recycled content: 12.7 wt. %; appearance: light amber liquid.

Polyol B

The procedure used to make Polyol A is generally followed using polyethylene terephthalate (15.0 pbw) and diethylene glycol (14.3 pbw), but no glycerin. Additionally, castor oil (50.0 pbw) is used, but adipic acid (20.7 pbw) is used instead of phthalic anhydride. The final product is isolated as previously described. Hydroxyl number: 51.5 mg KOH/g; average hydroxyl functionality: 2.80; viscosity: 9898 cP at 25° C.; Mn: 3050 g/mol; Mw/Mn: 2.6; acid number: 2.1 mg KOH/g; sustainable content: 79.2 wt. %; recycled content: 29.3 wt. %; appearance: light amber liquid.

Polyol C

The procedure used to make Polyol B is generally followed using polyethylene terephthalate (20.0 pbw), diethylene glycol (12.2 pbw), castor oil (50.0 pbw), and adipic acid (17.8 pbw). The final product is isolated as previously described. Hydroxyl number: 52.0 mg KOH/g; average hydroxyl functionality: 2.80; viscosity: 12,500 cP at 25° C.; Mn: 3020 g/mol; Mw/Mn: 2.6; acid number: 2.5 mg KOH/g; sustainable content: 82.1 wt. %; recycled content: 32.2 wt. %; appearance: light amber liquid.

Polyol D

The procedure used to make Polyol A is generally followed using polyethylene terephthalate (10.0 pbw), diethylene glycol (14.0 pbw), and glycerin (1.0 pbw). Additionally, castor oil (30.0 pbw), ricinoleic acid (26.1 pbw), and adipic acid (18.9 pbw) are used (instead of castor oil and phthalic anhydride). The final product is isolated as previously described. Hydroxyl number: 68.1 mg KOH/g; average hydroxyl functionality: 2.90; viscosity: 7,480 cP at 25° C.; Mn: 2390 g/mol; Mw/Mn: 2.4; acid number: 1.9 mg KOH/g; sustainable content: 81.0 wt. %; recycled content: 24.0 wt. %; appearance: amber liquid.

Polyol E

The procedure used to make Polyol A is followed. The source of the PET is scrap PET from an automotive trunk liner. Polyol E has: hydroxyl number: 153 mg KOH/g; viscosity: 1886 cP at 25° C.; average hydroxyl functionality: 2.65; Mn: 971 g/mol; appearance: black liquid.

Polyol F

The procedure used to make Polyol B is followed. The source of the PET is scrap PET from an automotive trunk liner. Polyol F has: hydroxyl number: 71.1 mg KOH/g; viscosity: 17,600 cP at 25° C.; average hydroxyl functionality: 2.80; Mn: 2210 g/mol; appearance: black liquid.

Polyol G

The procedure used to make Polyol C is followed. The source of the PET is scrap PET from an automotive trunk liner. Polyol G has: hydroxyl number: 39.9 mg KOH/g; viscosity: 32,500 cP at 25° C.; average hydroxyl functionality: 2.80; Mn: 3940 g/mol; appearance: black liquid.

Polyol H

The procedure used to make Polyol D is followed. The source of the PET is scrap PET from an automotive trunk liner. Polyol H has: hydroxyl number: 47.6 mg KOH/g; viscosity: 8,980 cP at 25° C.; average hydroxyl functionality: 2.90; Mn: 3420 g/mol; appearance: black liquid.

A screening flexible foam produced from one of the trunk liner-based polyols was flexible and had good apparent airflow and resiliency properties.

Water-Blown Flexible Polyurethane Foams

Flexible Slabstock Foam

A conventional flexible slabstock formulation is used to produce water-blown foams from Voranol® 3322 (polyether triol with secondary OH groups, 88% PO, 12% EO, hydroxyl number=48 mg KOH/g, product of Dow), and each of Polyols A-D as described above. The polyol component is well-blended with the other "B-side" components (silicone surfactant, amine catalysts, tin catalyst, and water). Toluene diisocyanate (an 80:20 mixture of 2,4- and 2,6-isomers, 1.05 NCO/OH index) is added in one portion. The mixture is blended at high speed, and the blended contents are immediately poured into a 3-L cylindrical "popcorn" container, where the mixture is allowed to foam, rise, cream, and cure under ambient conditions. The foams are subsequently post-cured at 50° C. for 3-6 h. Formulation details appear in Table 1, Formulations CF6 and F7-F10.

Table 1 also provides a qualitative assessment of the performance of non-optimized flexible foams made using the inventive polyester polyols as "drop-in" replacements for a commercial polyether polyol (Voranol® 3322). Reasonably good appearance, shrinkage, tensile strength, and resiliency properties are seen with 100% of the polyester polyol. The preliminary results indicate that improved foams can be made with optimized formulations, particularly formulations that use blends of the inventive polyester polyols with commercially available polyether polyols.

Molded Foams

A hot-molded flexible foam formulation is used to produce water-blown foams from Voranol® 4701 (EO-capped triol, hydroxyl number=34 mg KOH/g, product of Dow) and each of Polyols A-D as described above. The polyol component is well-blended with the other "B-side" components (silicone surfactant, amine catalysts, tin catalyst, and water). Toluene diisocyanate (an 80:20 mixture of 2,4- and 2,6-isomers, 1.05 NCO/OH index) is added in one portion. The mixture is blended at high speed, and the blended contents are immediately poured into a 3-L cylindrical "popcorn" container, where the mixture is allowed to foam, rise, cream, and cure under ambient conditions. The foams are subsequently post-cured at 50° C. for 3-6 h. Formulation details appear in Table 2, Formulations CF6 and F7-F10.

Water-blown, hot-molded flexible foams are also produced from Hyperlite® E-824 (EO-capped trial, hydroxyl number=36 mg KOH/g, product of Covestro), Hyperlite® 1639 (styrene-acrylonitrile polymer polyol, 41% solids, hydroxyl number=18 mg KOH/g), and each of Polyols B and C as described above. The polyol component is well-blended with the other "B-side" components (silicone surfactant, amine catalyst, diethanolamine crosslinker, tin catalyst, and water). Toluene diisocyanate (an 80:20 mixture of 2,4- and 2,6-isomers, 1.00 NCO/OH index) is added in one portion. The mixture is blended at high speed, and the blended contents are immediately poured into a 3-L cylindrical "popcorn" container, where the mixture is allowed to foam, rise, cream, and cure under ambient conditions. The foams are subsequently post-cured at 50° C. for 3-6 h. Formulation details appear in Table 3, Formulations CF11 and F12-F15.

Viscoelastic Foams

Viscoelastic foams are produced using a relatively low NCO/OH index. Jeffol® FX31-167 (glycerin-initiated, PO-based polyether, hydroxyl number=167 mg KOH/g, product of Huntsman) and Arcol® HS-100 (styrene-acrylonitrile polymer polyol, hydroxyl number=28 mg KOH/g, product of Covestro) are well-blended with the other "B-side" components (silicone surfactant, amine catalysts, tin catalyst, and water). Toluene diisocyanate (an 80:20 mixture of 2,4- and 2,6-isomers, 0.90 or 0.85 NCO/OH index) is added in one portion. The mixture is blended at high speed, and the blended contents are immediately poured into a 3-L cylindrical "popcorn" container, where the mixture is allowed to foam, rise, cream, and cure under ambient conditions. The foams are subsequently post-cured at 50° C. for 3-6 h. Formulation details appear in Table 4, Formulations CF16 and F17-F20.

High-Resilience Foams

High-resilience flexible slabstock foams are also produced. Arcol® F-3222 (glycerin-initiated, PO-based polyether trial, hydroxyl number=52.6 mg KOH/g, product of Covestro) and Arcol® HS-200 (styrene-acrylonitrile polymer polyol, hydroxyl number=25.5 mg KOH/g) are well-blended with the other "B-side" components (silicone surfactant, amine catalyst, tin catalyst, crosslinker, and water). Toluene diisocyanate (an 80:20 mixture of 2,4- and 2,6-isomers, 1.15 NCO/OH index) is added in one portion. The mixture is blended at high speed, and the blended contents are immediately poured into a 3-L cylindrical "popcorn" container, where the mixture is allowed to foam, rise, cream, and cure under ambient conditions. The foams are subsequently post-cured at 50° C. for 3-6 h. Formulation details appear in Table 5, Formulations CF21 and F22-F25.

TABLE 2

Molded Foam Formulations (pbw)

|  | CF6* | F7 | F8 | F9 | F10 |
|---|---|---|---|---|---|
| Voranol ® 4701 | 100 | — | — | — | — |
| Polyol A | — | 100 | — | — | — |
| Polyol B | — | — | 100 | — | — |
| Polyol C | — | — | — | 100 | — |
| Polyol D | — | — | — | — | 100 |
| Tegostab ® BF 2370 | 1.0 | 1.0 | 1.0 | 1.0 | 1.0 |
| Water | 3.0 | 3.0 | 3.0 | 3.0 | 3.0 |
| Dabco ® 33LV | 0.08 | 0.08 | 0.08 | 0.08 | 0.08 |
| N-ethylmorpholine | 1.26 | 1.26 | 1.26 | 1.26 | 1.26 |
| Dimethylethanolamine | — | — | — | — | — |
| Stannous octoate | 0.10 | 0.10 | 0.10 | 0.10 | 0.10 |
| TDI | 36.06 | 50.94 | 37.96 | 37.49 | 39.30 |
| NCO/OH index | 1.05 | 1.05 | 1.05 | 1.05 | 1.05 |

Voranol ® 4701 is a product of Dow Chemical. Tegostab ® BF 2370 stabilizer is a product of Evonik. Dabco ® 33LV amine catalyst is a product of Air Products.
*Comparative formulation.

TABLE 3

Molded Foam Formulations (pbw)

|  | CF11* | F12 | F13 | F14 | F15 |
|---|---|---|---|---|---|
| Hyperlite ® E-824 | 70 | 70 | 49 | 70 | 49 |
| Hyperlite ® 1639 | 30 | — | 21 | — | 21 |
| Polyol B | — | 30 | 30 | — | — |
| Polyol C | — | — | — | 30 | 30 |
| Tegostab ® BF 2370 | 1.0 | 1.0 | 1.0 | 1.0 | 1.0 |

TABLE 1

Flexible Slabstock Foam Formulations (pbw)

|  | CF1* | F2 | F3 | F4 | F5 |
|---|---|---|---|---|---|
| Voranol ® 3322 | 100 | — | — | — | — |
| Polyol A | — | 100 | — | — | — |
| Polyol B | — | — | 100 | — | — |
| Polyol C | — | — | — | 100 | — |
| Polyol D | — | — | — | — | 100 |
| Tegostab ® BF 2370 | 1.5 | 1.5 | 1.5 | 1.5 | 1.5 |
| Water | 4.0 | 4.0 | 4.0 | 4.0 | 4.0 |
| Dabco ® 33LV | — | — | — | — | — |
| N-ethylmorpholine | — | — | — | — | — |
| Dimethylethanolamine | 0.20 | 0.20 | 0.20 | 0.20 | 0.20 |
| Dibutyltin dilaurate | 0.20 | 0.20 | 0.20 | 0.20 | 0.20 |
| TDI | 48.62 | 61.22 | 48.24 | 47.77 | 49.58 |
| NCO/OH index | 1.05 | 1.05 | 1.05 | 1.05 | 1.05 |
| Density (before shrinkage test), pcf | 1.80 | 2.00 | 2.41 | 2.18 | 2.07 |
| Appearance | White; uniform small cells; some dispersed larger cells | Pale yellow; uniform small cells; no dispersed larger cells | Pale yellow; uniform small cells; some dispersed larger cells | Pale yellow, uniform small cells; some dispersed larger cells | Pale yellow, uniform small cells; some dispersed larger cells |
| Shrinkage (50° C., 1.5 h) | 5% | 10% | 15% | 40% | 40% |
| Tensile strength | Difficult to pull small pieces away from cupfoam | Small pieces removable from cupfoam | Small pieces removable from cupfoam | Easily torn pieces, low tensile strength | Easily torn pieces, low tensile strength |
| Resiliency | When pressed, a quick, full recovery | When pressed, a slower recovery | When pressed, a quick, full recovery | Foam damaged when pressed | Foam damaged when pressed |

Voranol ® 3322 is a product of Dow Chemical.
Tegostab ® BF 2370 stabilizer is a product of Evonik.
Dabco ® 33LV amine catalyst is a product of Air Products.
*Comparative formulation.

TABLE 3-continued

Molded Foam Formulations (pbw)

| | CF11* | F12 | F13 | F14 | F15 |
|---|---|---|---|---|---|
| Water | 4.2 | 4.2 | 4.2 | 4.2 | 4.2 |
| Dabco ® 33LV | 0.5 | 0.5 | 0.5 | 0.5 | 0.5 |
| Diethanolamine | 1.2 | 1.2 | 1.2 | 1.2 | 1.2 |
| Stannous octoate | 0 | 0 | 0.05 | 0.05 | 0.10 |
| TDI | 48.8 | 50.1 | 49.5 | 49.9 | 49.3 |
| NCO/OH index | 1.00 | 1.00 | 1.00 | 1.00 | 1.00 |

Hyperlite ® E-824 and Hyperlite ® 1639 are products of Covestro. Tegostab ® BF 2370 stabilizer is a product of Evonik. Dabco ® 33LV amine catalyst is a product of Air Products.
*Comparative formulation.

TABLE 4

Viscoelastic Foam Formulations (pbw)

| | CF16* | F17 | F18 | F19 | F20 |
|---|---|---|---|---|---|
| Jeffol ® FX31-167 | 80 | — | — | 40 | 40 |
| Arcol ® HS-100 | 20 | 20 | 20 | 10 | 10 |
| Polyol A | — | 80 | 80 | 30 | — |
| Polyol B | — | — | — | — | 30 |
| Tegostab ® BF 2370 | 1.0 | 1.0 | 1.0 | 1.0 | 1.0 |
| Water | 1.5 | 1.5 | 1.5 | 1.5 | 1.5 |
| Dabco ® 33LV | 0.08 | 0.08 | 0.08 | 0.08 | 0.08 |
| N-ethylmorpholine | 1.26 | 1.26 | 1.26 | 1.26 | 1.26 |
| Stannous octoate | 0.10 | 0.10 | 0.10 | 0.10 | 0.10 |
| TDI | 32.6 | 27.9 | 26.4 | 27.7 | 24.4 |
| NCO/OH index | 0.90 | 0.90 | 0.85 | 0.90 | 0.90 |

Jeffol ® FX31-167 is a product of Huntsman. Arcol ® HS-100 is a product of Covestro. Tegostab ® BF 2370 stabilizer is a product of Evonik. Dabco ® 33LV catalyst is a product of Air Products.
*Comparative formulation.

TABLE 5

High-Resilience Slabstock Foam Formulations (pbw)

| | CF21* | F22 | F23 | F24 | F25 |
|---|---|---|---|---|---|
| Arcol ® F-3222 | 20 | 15 | 15 | 25 | 25 |
| Arcol ® HS-200 | 80 | 60 | 60 | 25 | 25 |
| Polyol A | — | 25 | — | 50 | — |
| Polyol B | — | — | 25 | — | 50 |
| Dabco ® DC5043 | 0.9 | 0.9 | 0.9 | 0.9 | 0.9 |
| Water | 2.2 | 2.2 | 2.2 | 2.2 | 2.2 |
| Dabco ® 33LV | 0.27 | 0.27 | 0.27 | 0.27 | 0.27 |
| Niax ® A-1 | 0.09 | 0.09 | 0.09 | 0.09 | 0.09 |
| Diethanolamine | 0.7 | 0.7 | 0.7 | 0.7 | 0.7 |
| Dibutyltin dilaurate | 0.25 | 0.25 | 0.25 | 0.25 | 0.25 |
| TDI | 32.3 | 36.5 | 33.0 | 41.5 | 34.4 |
| NCO/OH index | 1.15 | 1.15 | 1.15 | 1.15 | 1.15 |

Arcol ® F-3222 and Arcol ® HS-200 are products of Covestro. Dabco ® 33LV catalyst and Dabco ® DC5043 stabilizer are products of Air Products. Niax ® A-1 is a product of Momentive.
*Comparative formulation.

Additional molded foams useful for automotive applications are produced from Polyols A, B, C, and D, which have 8.2 wt. %, 15.0 wt. %, 20.0 wt. %, and 10.0 wt. %, respectively, of PET. The foams are produced using Voranol® 4701, liquid MDI (Rubinate® 7304, product of Huntsman). Representative formulations are shown in Table 6:

TABLE 6

Molded Foam Formulations (pbw) from PET Polyols

| Voranol ® 4701 | 100 | 90 | 80 | 70 | 50 |
|---|---|---|---|---|---|
| PET polyol A, B, C, or D (8.2 to 20 wt. % PET) | — | 10 | 20 | 30 | 50 |
| Tegostab ® B4690 | 0.5 | 0.5 | 0.5 | 0.5 | 0.5 |
| Water | 3.0 | 3.0 | 3.0 | 3.0 | 3.0 |
| Niax ® A1 | 0.3 | 0.3 | 0.3 | 0.3 | 0.3 |
| Niax ® A300 | 0.6 | 0.6 | 0.6 | 0.6 | 0.6 |
| Lumulse ® POE(26) GLYC | 1.0 | 1.0 | 1.0 | 1.0 | 1.0 |
| Diethanolamine | 1.5 | 1.5 | 1.5 | 1.5 | 1.5 |
| Rubinate ® 7304 (MDI) | 53.8 | 54.3 | 54.8 | 55.4 | 56.4 |
| NCO/OH index | 1.05 | 1.05 | 1.05 | 1.05 | 1.05 |

Voranol ® 4701 is a product of Dow Chemical. Tegostab ® B4690 stabilizer is a product of Evonik. Niax ® A1 and Niax ® A300 catalysts are products of Momentive. Lumulse ® POE(26) GLYC cell opener is a product of Lambent Corp. Rubinate ® 7304 is liquid MDI, product of Huntsman.
*Comparative formulation.

Molded Foam Preparation

Foams are prepared in a laboratory fume hood via a one-step synthesis method, and cured in a closed mold system, measuring 38.1×38.1×10.2 cm$^3$. The mold is coated with a release agent, and heated to 65° C. for 15 minutes prior to preparing the foam. The preparation of the polyols with the additives is taken separately from the measuring of the isocyanate, to isolate the reaction step. PET-polyol, petroleum polyol, and the additives are measured into an inert container. Foams are prepared by replacing the petroleum polyol with 10 wt. %, 20 wt. %, 30 wt. %, and 50 wt. % recycled PET-based polyol. With the synthesis of foams from each polyol, a control foam block is made containing 100% petroleum polyol, Voranol® 4701, to serve as a referential comparison for the foams synthesized that same day. The polyols and additives are mixed using a standard lab-scale hand-mixing apparatus for 180 s at 1500 rpm. The required amount of isocyanate is then added to the mixture, and mixed for an additional 12 s. The thoroughly blended combination is promptly poured into the mold, and allowed to rise and set for 6 min. The foam is then released from the mold, and massaged by hand to release trapped gases. For curing, foams are placed in a preheated oven at 65° C. for 30 minutes and allowed to sit at room temperature for at least 12 h.

Foam Characterization and Testing

To conform to standard testing dimensions, the foams are cut using a band saw and stamped using a USM Hytronic Model B press. Six samples are chosen at random for testing of each foam formulation. The tensile strength, tear strength, and compression force are measured on an Instron 3366 apparatus. Selected physical and mechanical properties of each foam are tested according to the following standards: compression set (humidity aging chamber): ASTM 3574-08, Test L; compression force deflection: ASTM 3574-08, Test C; density: ASTM 3574-08, Test A; tensile strength at break: ASTM 3574-08, Test E; tear strength: ASTM D 624, Die C.

Tables 7-16 provide results of physical testing of molded foams made from PET polyols A, B, C, and D.

TABLE 7

Density (kg/m$^3$) of Molded Foams

| Wt. % PET polyol | Polyol A | Polyol D | Polyol B | Polyol C |
|---|---|---|---|---|
| 0 | 45.8 | 46.9 | 44.3 | 45.4 |
| 10 | 47.1 | 43.7 | 48.0 | 42.4 |
| 20 | 49.0 | 45.7 | 47.1 | 43.7 |
| 30 | 49.2 | 46.6 | 46.4 | 45.5 |
| 50 | 49.8 | 45.6 | 45.4 | 47.1 |

TABLE 8

Tensile stress at maximum extension (kPa) of Molded Foams

| Wt. % PET polyol | Polyol A | Polyol D | Polyol B | Polyol C |
|---|---|---|---|---|
| 0 | 69.8 | 71.8 | 62.1 | 86.8 |
| 10 | 70.6 | 93.2 | 74.5 | 102.1 |
| 20 | 78.6 | 100.8 | 82.6 | 113.3 |
| 30 | 102.1 | 114.5 | 83.4 | 116.8 |
| 50 | 123.0 | 131.7 | 110.6 | 113.0 |

TABLE 9

Tensile modulus (MPa) of Molded Foams

| Wt. % PET polyol | Polyol A | Polyol D | Polyol B | Polyol C |
|---|---|---|---|---|
| 0 | 0.14 | 0.15 | 0.16 | 0.19 |
| 10 | 0.11 | 0.24 | 0.15 | 0.23 |
| 20 | 0.17 | 0.22 | 0.19 | 0.24 |
| 30 | 0.28 | 0.25 | 0.18 | 0.26 |
| 50 | 0.43 | 0.30 | 0.35 | 0.30 |

TABLE 10

Tear resistance (N/m) of Molded Foams

| Wt. % PET polyol | Polyol A | Polyol D | Polyol B | Polyol C |
|---|---|---|---|---|
| 0 | 386 | 471 | 333 | 455 |
| 10 | 388 | 503 | 406 | 458 |
| 20 | 398 | 437 | 355 | 523 |
| 30 | 434 | 558 | 399 | 525 |
| 50 | 489 | 570 | 505 | 589 |

TABLE 11

Wet compression set (%) of Molded Foams

| Wt. % PET polyol | Polyol A | Polyol D | Polyol B | Polyol C |
|---|---|---|---|---|
| 0 | 27.2 | 25.9 | 30.0 | 23.6 |
| 10 | 28.4 | 29.0 | 29.5 | 26.7 |
| 20 | 30.2 | 27.2 | 31.7 | 34.3 |
| 30 | 32.0 | 34.6 | 33.6 | 35.7 |
| 50 | 35.7 | 36.6 | 41.7 | 40.3 |

TABLE 12

Compression modulus (kPa) of Molded Foams

| Wt. % PET polyol | Polyol A | Polyol D | Polyol B | Polyol C |
|---|---|---|---|---|
| 0 | 43.2 | 49.8 | 46.0 | 33.5 |
| 10 | 56.6 | 48.7 | 48.2 | 52.6 |
| 20 | 73.6 | 60.0 | 62.7 | 48.3 |
| 30 | 103.6 | 69.9 | 65.9 | 62.3 |
| 50 | 121.4 | 108.4 | 92.8 | 99.7 |

TABLE 13

Sag factor 65%/25% of Molded Foams

| Wt. % PET polyol | Polyol A | Polyol D | Polyol B | Polyol C |
|---|---|---|---|---|
| 0 | 2.91 | 2.94 | 2.81 | 2.79 |
| 10 | 2.79 | 3.02 | 2.74 | 2.79 |
| 20 | 2.70 | 2.60 | 3.07 | 2.75 |
| 30 | 2.73 | 2.72 | 2.86 | 2.76 |
| 50 | 2.39 | 2.72 | 3.12 | 3.02 |

TABLE 14

Sag factor 50%/25% of Molded Foams

| Wt. % PET polyol | Polyol A | Polyol D | Polyol B | Polyol C |
|---|---|---|---|---|
| 0 | 1.66 | 1.70 | 1.64 | 1.64 |
| 10 | 1.62 | 1.70 | 1.60 | 1.62 |
| 20 | 1.56 | 1.54 | 1.70 | 1.64 |
| 30 | 1.57 | 1.59 | 1.62 | 1.60 |
| 50 | 1.46 | 1.58 | 1.72 | 1.65 |

TABLE 15

Strain at 50% compression (kPa) of Molded Foams

| Wt. % PET polyol | Polyol A | Polyol D | Polyol B | Polyol C |
|---|---|---|---|---|
| 0 | 4.90 | 5.78 | 5.45 | 4.56 |
| 10 | 6.49 | 5.35 | 5.73 | 6.06 |
| 20 | 8.33 | 7.40 | 6.35 | 5.90 |
| 30 | 11.72 | 8.36 | 7.30 | 7.36 |
| 50 | 15.62 | 12.72 | 9.89 | 10.27 |

TABLE 16

Strain at 65% compression (kPa) of Molded Foams

| Wt. % PET polyol | Polyol A | Polyol D | Polyol B | Polyol C |
|---|---|---|---|---|
| 0 | 8.57 | 9.94 | 9.32 | 7.74 |
| 10 | 11.13 | 9.46 | 9.77 | 10.37 |
| 20 | 14.43 | 12.46 | 11.49 | 9.89 |
| 30 | 20.38 | 14.29 | 12.82 | 12.69 |
| 50 | 25.56 | 21.87 | 17.87 | 18.74 |

Discussion of Results:

As shown in Table 7, the densities of the molded foam samples are all within about 5 kg/m$^3$ regardless of the content of PET-based polyol. Foam properties should be compared for samples of similar density. Because the densities of these samples are all reasonably similar, differences in other physical properties can be attributed to factors other than a density difference.

As shown in Tables 8 and 9, the tensile strength and modulus of the foam samples increases moderately as the wt. % of PET polyol in the polyol mixture increases from 0 to 50 wt. % (moving from top to bottom in the tables) or as the wt. % of PET in the PET polyol increases from 8.2 wt. % to 20 wt. % (moving from left to right in the tables).

Table 10 shows that tear resistance increases moderately as the wt. % of PET polyol in the polyol blend increases from 0 wt. % to 50 wt. %.

Tables 11 and 12 show that foams made from blends having a higher proportion of PET polyol or from a PET polyol having a higher proportion of PET generally have greater compression stiffness and a somewhat greater tendency to retain their compressed form. Numerous factors, including cell size and geometry, likely impact the results.

The sag factor results in Tables 13 and 14 are calculated from compressive stress values measured at 65% vs. 25% compression or 50% vs. 25% compression. Sag factor is a measure of seating comfort. Resistance to compression should increase with greater % compression values. Thus, an acceptable value for sag factor is typically 1 to 3. The results suggest acceptable sag factor values for all of the tested samples. In other words, the added PET content contributes to other desirable properties without adversely affecting sag factor. Tables 15 and 16 summarize compressive strain at 50% or 65% compression and generally show an increase in strain as the wt. % of PET polyol in the polyol mixture increases from 0 to 50 wt. % (reading from top to bottom) and an increase in strain as the wt. % of PET in the PET polyol increases from 8.2 wt. % to 20 wt. % (reading from left to right).

Overall, the results suggest that a substantial opportunity exists in molded foams for automotive applications to increase emphasis on the use of sustainable polyols made from thermoplastic polymer wastes, including recycled PET such as automotive PET scrap materials (trunk liners, dunnage trays, fuse box covers, etc.).

The preceding examples are meant only as illustrations; the following claims define the inventive subject matter.

We claim:

1. A polyester polyol composition comprising recurring units of:
   (a) 5 to 30 wt. % of a digested thermoplastic polyester;
   (b) 25 to 85 wt. % of castor oil or a mixture of castor oil and ricinoleic acid;
   (c) 2 to 20 wt. % of a glycol;
   (d) optionally, 2 to 30 wt. % of a dicarboxylic acid, a diester, or an anhydride, or combinations thereof; and
   (e) optionally, 0.1 to 2 wt. % of glycerin;
   wherein the polyol composition has a hydroxyl number within the range of 20 to 150 mg KOH/g and an average hydroxyl functionality within the range of 2.5 to 3.5.

2. The composition of claim 1 wherein the thermoplastic polyester is selected from the group consisting of polyethylene terephthalate; polybutylene terephthalate; polytrimethylene terephthalate; glycol-modified polyethylene terephthalate; copolymers of terephthalic acid and 1,4-cyclohexanedimethanol; isophthalic acid-modified copolymers of terephthalic acid and 1,4-cyclohexanedimethanol; polyhydroxy alkanoates; copolymers of diols with 2,5-furandicarboxylic acid or dialkyl 2,5-furandicarboxylates; copolymers of 2,2,4,4-tetramethyl-1,3-cyclobutanediol with isophthalic acid, terephthalic acid or orthophthalic derivatives; dihydroferulic acid polymers; and mixtures thereof.

3. The composition of claim 1 wherein the thermoplastic polyester is selected from the group consisting of virgin PET, recycled PET, and mixtures thereof.

4. The composition of claim 1 wherein the thermoplastic polyester is scrap polyethylene terephthalate recovered from automotive trunk liners, scrap polyethylene terephthalate from automotive parts dunnage, or other automotive thermoplastic polymer scrap material.

5. The composition of claim 1 comprising 8 to 20 wt. % of recurring units from recycled polyethylene terephthalate.

6. The composition of claim 1 comprising 25 to 55 wt. % of recurring units from castor oil.

7. The composition of claim 1 comprising 70 to 85 wt. % of recurring units from castor oil.

8. The composition of claim 1 comprising 4 to 15 wt. % of recurring units from diethylene glycol.

9. The composition of claim 1 having a hydroxyl number within the range of 40 to 150 mg KOH/g.

10. The composition of claim 1 having a hydroxyl number within the range of 50 to 140 mg KOH/g.

11. The composition of claim 1 having an average hydroxyl functionality within the range of 2.5 to 3.0.

12. The composition of claim 1 having an average hydroxyl functionality within the range of 2.65 to 2.90.

13. The composition of claim 1 comprising 15 to 25 wt. % of recurring units from adipic acid.

14. The composition of claim 1 comprising 20 to 30 wt. % of recurring units from ricinoleic acid.

15. A polyester polyol composition comprising recurring units of:
   (a) 10 to 20 wt. % of polyethylene terephthalate;
   (b) 30 to 50 wt. % of castor oil;
   (c) 10 to 15 wt. % of diethylene glycol;
   (d) 15 to 25 wt. % of adipic acid; and
   (e) optionally, 0.1 to 2 wt.% of glycerin;
   wherein the polyol composition has a hydroxyl number within the range of 40 to 75 mg KOH/g and an average hydroxyl functionality within the range of 2.7 to 3.0.

16. A polyester polyol composition comprising recurring units of:
   (a) 5 to 10 wt. % of polyethylene terephthalate;
   (b) 75 to 85 wt. % of castor oil;
   (c) 3 to 6 wt. % of diethylene glycol;
   (d) 3 to 6 wt. % of phthalic anhydride; and
   (e) optionally, 0.1 to 2 wt.% of glycerin;
   wherein the polyol composition has a hydroxyl number within the range of 120 to 150 mg KOH/g and an average hydroxyl functionality within the range of 2.5 to 2.8.

17. A polyester polyol composition comprising a blend of the composition of claim 1 with a polyether polyol or polymer polyol, wherein the polyether polyol or polymer polyol has a hydroxyl number within the range of 20 to 150 mg KOH/g and an average hydroxyl functionality within the range of 2.5 and 3.5.

* * * * *